United States Patent [19]

Foster

[11] Patent Number: 5,715,892

[45] Date of Patent: Feb. 10, 1998

[54] LEVELING HARROW

[75] Inventor: Phillip W. Foster, Lee, Ill.

[73] Assignee: Farmers' Factory Co., Lee, Ill.

[21] Appl. No.: 731,116

[22] Filed: Oct. 9, 1996

Related U.S. Application Data

[63] Continuation of Ser. No. 261,391, Jun. 17, 1994, abandoned.

[51] Int. Cl.$^6$ .................................................. A01B 5/00
[52] U.S. Cl. ........................ 172/200; 172/254; 172/549; 172/624.5; 172/484
[58] Field of Search .................................. 172/200, 254, 172/540, 548, 549, 551, 552, 553, 554, 624.5, 661, 307, 417, 483, 484

[56] References Cited

U.S. PATENT DOCUMENTS

| | | | |
|---|---|---|---|
| 1,122,461 | 12/1914 | Arundel | 172/548 |
| 1,805,865 | 5/1931 | Benzel | 172/548 |
| 2,154,840 | 4/1939 | Gard | 172/548 |
| 2,491,892 | 12/1949 | Claus | 172/549 |
| 2,691,933 | 10/1954 | Emerson | 172/548 |
| 2,787,491 | 4/1957 | Roberts | 172/254 |
| 2,886,114 | 5/1959 | Peterson | 172/307 |
| 2,943,687 | 7/1960 | Merry et al. | 172/254 |
| 3,102,376 | 9/1963 | Henderson | 172/549 X |
| 3,107,737 | 10/1963 | Van Sickle | 172/548 |
| 3,714,992 | 2/1973 | Meier | 172/548 |
| 3,991,831 | 11/1976 | Foster | 172/198 |
| 4,108,089 | 8/1978 | Van der Lely | 172/484 |
| 4,421,176 | 12/1983 | Tuggle et al. | 172/555 X |
| 4,840,232 | 6/1989 | Mayer | 172/548 |
| 4,950,102 | 8/1990 | Zeitz | 172/548 |
| 5,158,145 | 10/1992 | Karchewski | 172/548 |
| 5,228,522 | 7/1993 | Stufflebeam et al. | 172/417 |

FOREIGN PATENT DOCUMENTS

| | | | |
|---|---|---|---|
| 1006646 | 4/1957 | Germany | 172/307 |

*Primary Examiner*—Terry Lee Melius
*Assistant Examiner*—Victor Batson
*Attorney, Agent, or Firm*—Leydig, Voit & Mayer, Ltd.

[57] ABSTRACT

The harrow includes a series of sleeves each having a plurality of teeth and telescoped non-rotatably over a rod which is rotatably journaled by laterally spaced bearings supported by mounting arms which, in turn, are attached to a tool bar. The teeth roll over the ground and pulverize and level the soil as the tool bar is pulled forwardly. The toothed sleeves may be laterally positioned as necessary on the rod to enable the bearings and the mounting arms to be located laterally as required to permit attachment of the arms to any particular tool bar. The tool bar is supported by parallel links which may be adjusted upwardly or downwardly by manually operable jacks in order to change the operating height of the harrow, the jacks being connected to the links in such a manner as to enable the links to float upwardly or downwardly in the event the harrow encounters a rise or falls into a valley.

5 Claims, 5 Drawing Sheets

5,715,892

LEVELING HARROW

This is a continuation of application Ser. No. 08/261,391 filed on Jun. 17, 1994, now abandoned.

BACKGROUND OF THE INVENTION

The invention relates generally to a farm implement and, more particularly, to a harrow for leveling ground. The harrow may be attached to and pulled by a plow or other cultivating implement or may simply be attached to a tool bar and pulled through a previously tilled field.

A very commercially successful harrow is disclosed in Foster U.S. Pat. No. 3,991,831. That harrow includes an elongated leveling rod having a series of angled teeth which are urged into the ground in order to break up and pulverize clods and smaller chunks of earth into loose soil. The leveling rod is attached to the lower ends of mounting arms which are adapted to be connected to the tool bar or to the rear beam of the leading implement.

While the harrow of the Foster patent functions well in plowed and relatively loose ground, it is less satisfactory when used to level minimally tilled soil. The trash or residue left from the previous yearns harvest tends to build up between and in front of the teeth and prevents the teeth from breaking through the crust and leveling the soil.

SUMMARY OF THE INVENTION

The general aim of the present invention is to provide a new and improved harrow which more effectively works fields with relatively heavy residue, A more detailed object of the invention is to provide a harrow having rolling teeth which are capable of breaking into the ground while allowing residue to pass through the teeth.

An important object of the invention is to provide a harrow having teeth which are mounted on a rotatable rod and which are laterally segmented so as to enable rod-supporting bearings and arms-to be attached to the rod at various positions along the rod.

The invention also resides in the provision of an implement having a height adjustment actuator associated with a parallel bar linkage and capable of enabling the linkage to pivot upwardly or downwardly when the implement encounters a raised obstruction or dips into a valley.

These and other objects and advantages of the invention will become more apparent from the following detailed description when taken in conjunction with the accompanying drawings.

Figure 1:
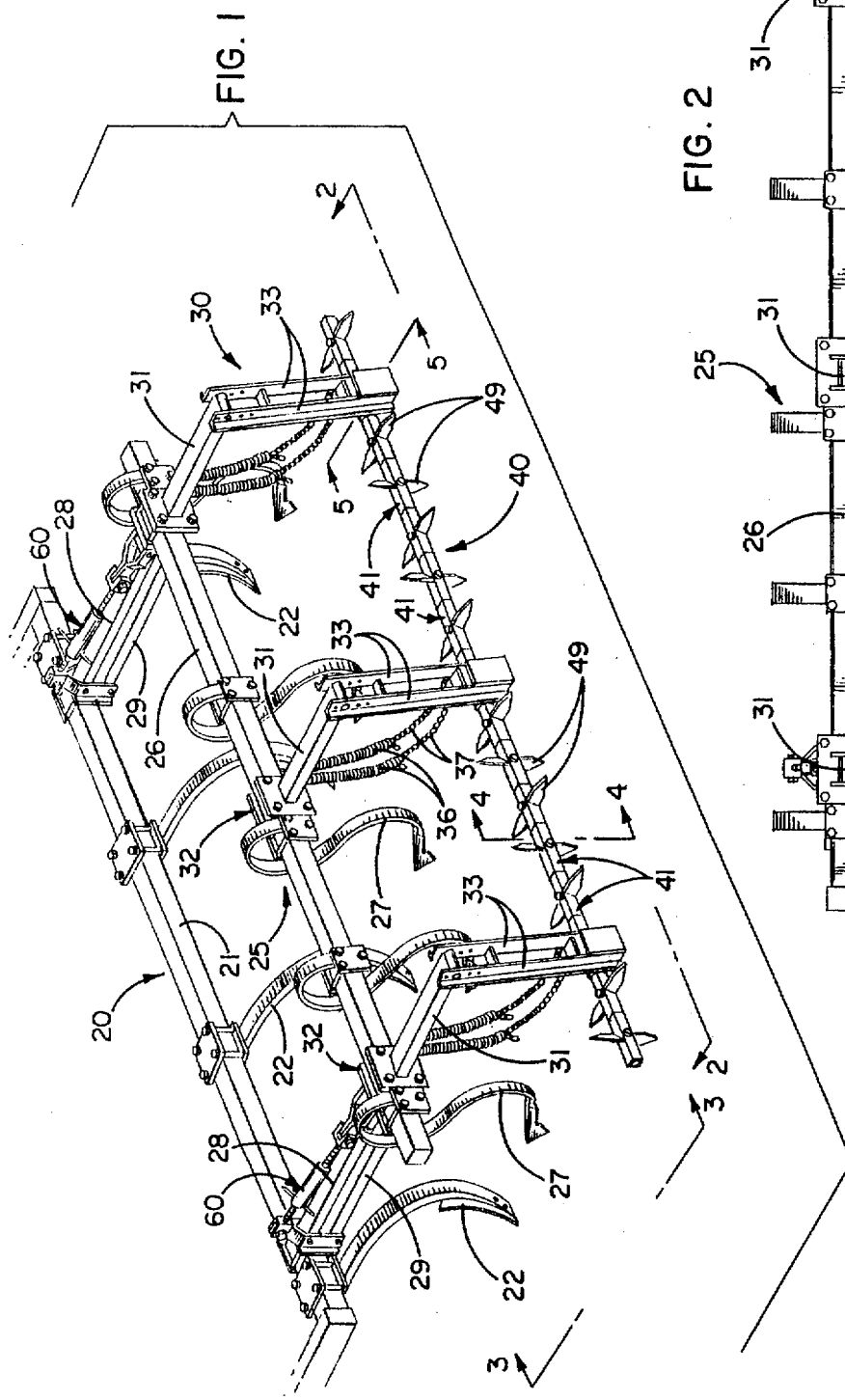
FIG. 1 is a rear perspective view of a typical ground cultivating implement equipped with a new and improved harrow incorporating the unique features of the present invention.
Figure 2:
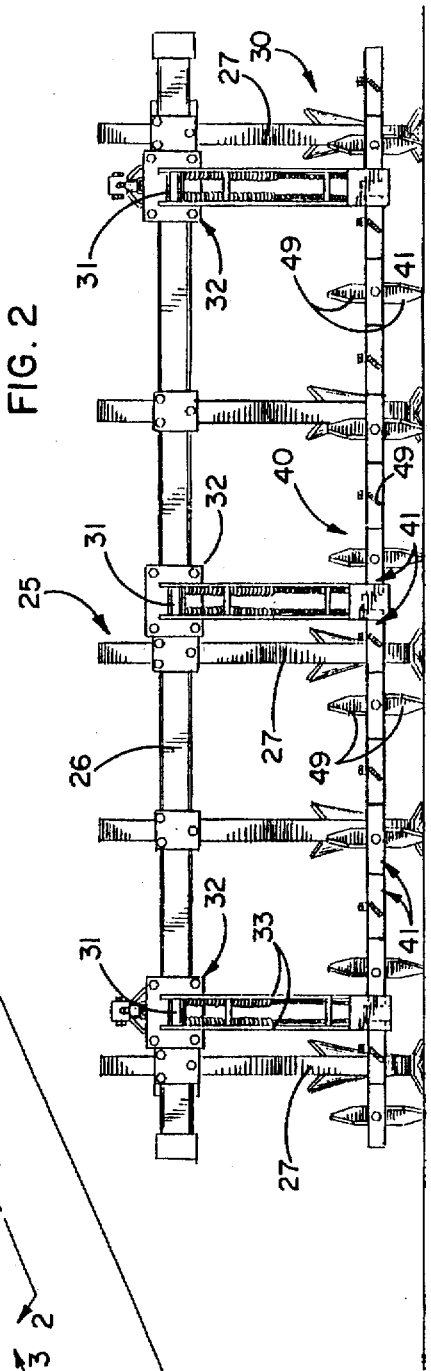
FIG. 2 is an enlarged rear elevation of the implement and the harrow as seen along the line 2—2 of FIG. 1.

While the invention is susceptible of various modifications and alternative constructions, certain illustrated embodiments hereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

For purposes of illustration, the present invention has been shown in conjunction with a ground tillage implement such as a chisel plow 20 adapted to be pulled forwardly across a field by a tractor (not shown). The plow includes a rear beam 21 which carries several laterally spaced shovels 22.

In this particular instance, a second implement 25 has been shown as connected to and trailing the plow 20. The implement includes a beam or tool bar 26 which carries several laterally spaced and generally S-shaped tines 27. The tines are made of spring steel and serve to split in half the ridges left by the shovels 22. The tool bar 26 is connected to the beam 21 by two laterally spaced sets of upper and lower parallel links 28 and 29.

A harrow 30 is attached to and trails the tool bar 26 and serves to knock off the tops of the ridges and level the field. In the event the implement 25 is not used, the harrow may be attached directly to the beam 21 of the plow 20 or to a tool bar connected directly to the tractor.

Figure 3:
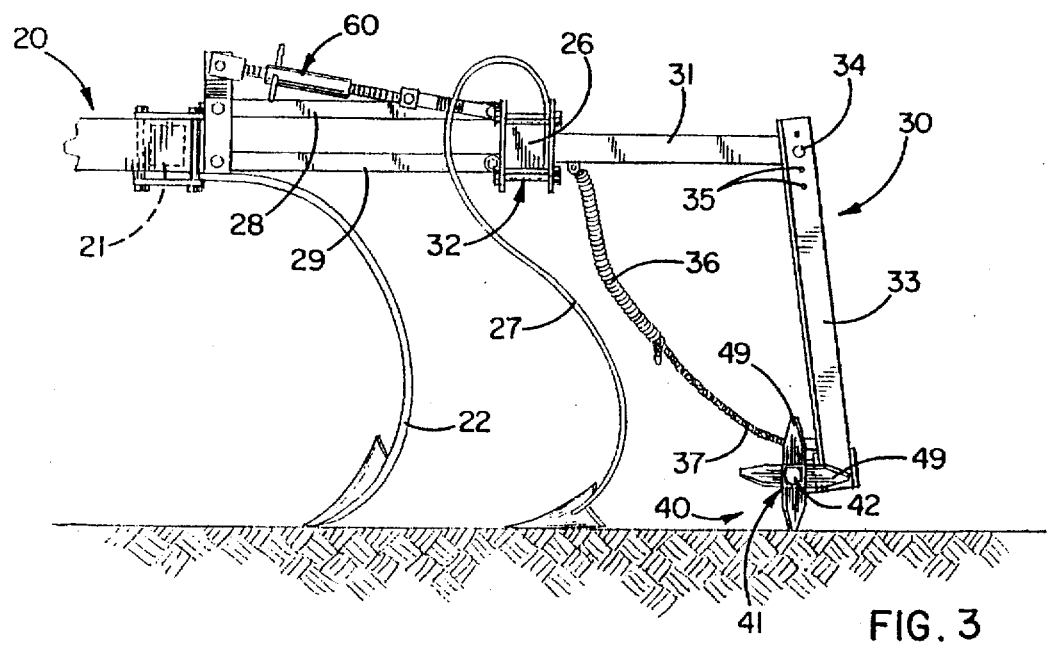
FIG. 3 is an enlarged fragmentary side elevation of the implement and the harrow as seen along the line 3—3 of FIG. 1.
Figure 4:
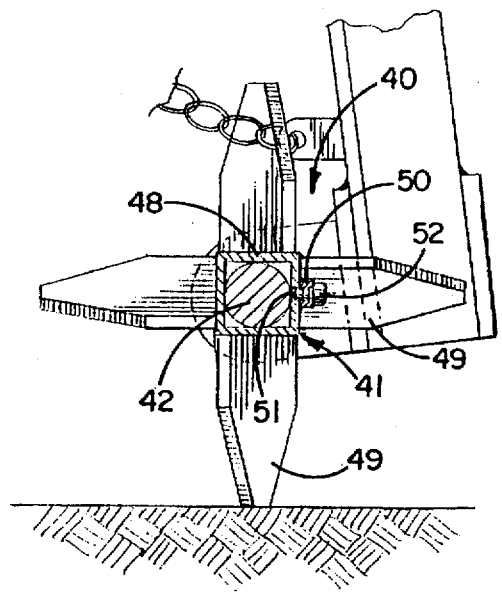
FIGS. 4 and 5 are enlarged fragmentary cross-sections taken substantially along the lines 4—4 and 5—5, respectively, of FIG. 1.
Figure 5:
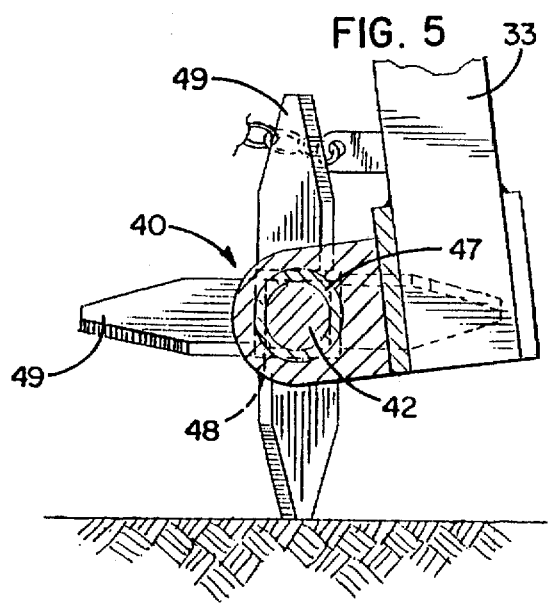
Figure 6:
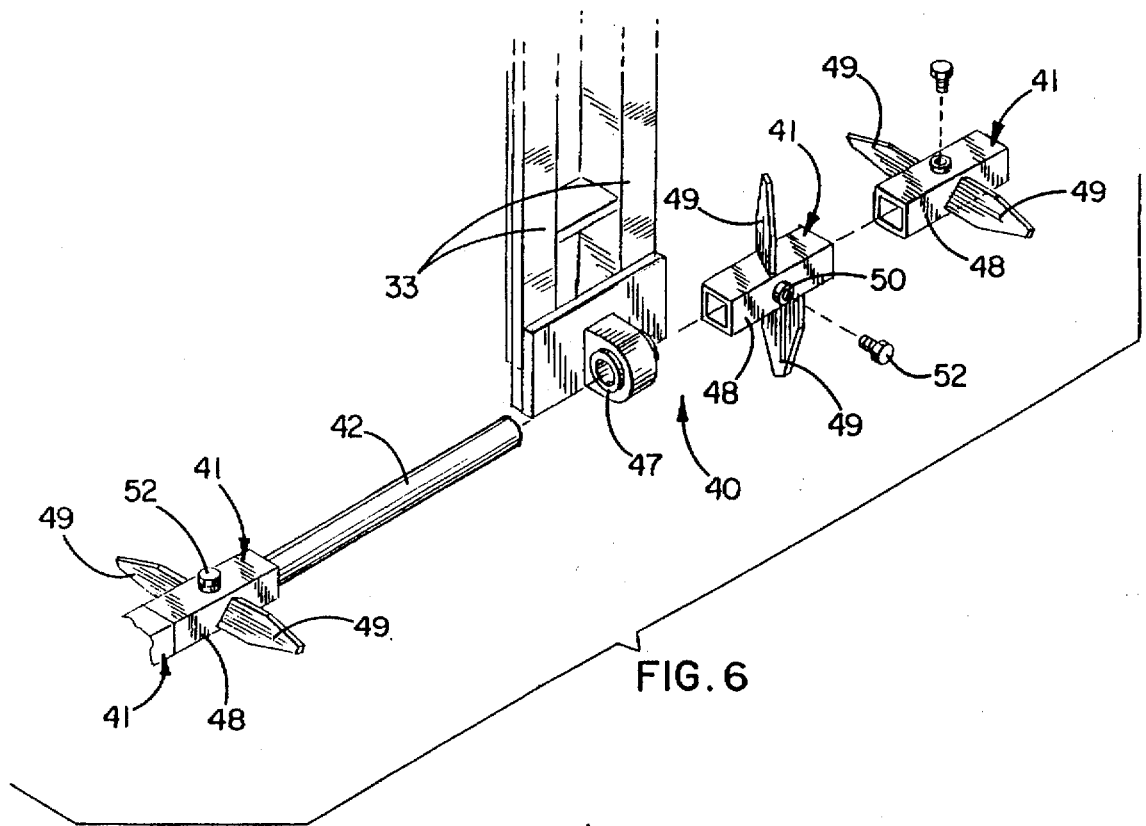
FIG. 6 is an exploded front perspective view of certain components of the harrow.

Herein, the harrow 30 includes three laterally spaced mounting arms 31 (FIG. 1) which are secured to and project rearwardly from the tool bar 26, the mounting arms being secured rigidly to the tool bar by U-bolt/plate clamps 32. The upper end portions of two brackets or swing arms 33 straddle the rear end portion of each mounting arm 31 and are pivotally secured thereto by a bolt 34 (FIG. 3) which permits the swing arms to pivot upwardly and downwardly. The bolt may be inserted through any selected pair of vertically spaced holes 35 in the swing arms to enable adjustment of the height of the swing arms. For a purpose to be described subsequently, two contractile springs 36 are connected to the forward end portion of each mounting arm 31 and are connected by chains 37 to the lower end portions of the swing arms 33.

Carried on the lower end portions of the swing arms 33 is a laterally extending leveler 40 which serves to knock off the tops of the ridges and work the field to a level condition. In accordance with the present invention, the leveler is formed by a segmented series of rotatable toothed units 41 which aggressively work the ground without being clogged by trash or the like and which enable the mounting arms 31 to be located laterally on the tool bar 26 in such positions as necessary to accommodate the particular characteristics of the tool bar.

More specifically, the leveler 40 shown in FIGS. 1–6 includes an elongated cylindrical rod 42 (FIGS. 4–6) which is rotatably journaled at three laterally spaced locations by bearings 47 supported by the lower end portions of the three sets of swing arms 33. In carrying out the invention, each toothed segment 40 includes a relatively short sleeve 48 (e.g., 6" long) telescoped over the rod 42 and secured against rotation relative thereto. Each sleeve preferably is formed by a section of steel tubing having square internal and external cross-sectional shapes. Two teeth 49 are welded to flat diametrically opposite sides of each sleeve and project in opposite directions therefrom. The teeth of each sleeve are oppositely pitched.

Each sleeve 41 fits slidably over the rod 42 but, once properly located, is held against sliding and rotating on the sleeve. For this purpose, a tapped collar 50 (FIG. 6) is welded to one side of each sleeve (preferably, a side without a tooth 49) and is aligned with a hole 51 (FIG. 4) formed through the sleeve. Anchoring of each sleeve to the rod is effected by threading a set screw 52 into the collar and by tightening the screw until its tip tightly clamps against the rod. Adjacent sleeves have been specifically illustrated as being positioned on the rod such that the teeth of each sleeve are spaced 90 degrees from the teeth of the neighboring sleeve. The sleeves could, however, be oriented such that each tooth is spaced angularly from the laterally adjacent tooth by only 45 degrees so as to create a tighter spiral of teeth around and along the rod.

When the harrow 30 is pulled forwardly, the teeth 49 engage the ground and resist forward movement of the rod 42. As a result, the swing arms 33 tend to pivot upwardly or rearwardly and stretch the springs 36. As the harrow travels forwardly, the springs urge the swing arms downwardly so as to press the teeth into the ground. The resistance which the teeth encounter causes the teeth to rotate with such rotation being permitted by the bearing-supported rod 42. As a result, the teeth break through the soil and break up and pulverize clods while leveling the tops of the ridges. Because the teeth rotate, field residue and trash does not tend to build up in front of or clog between the teeth but instead passes through the teeth so as to leave the teeth free to effectively pulverize the earth.

A significant advantage of the toothed segments 41 is that the segments may be used to fabricate a leveler 40 of any desired length. Thus, segments 41 of the same type may be used to build a leveler ranging, for example, from 4' to 13' simply by using a rod 42 of appropriate length and by equipping the rod with the necessary number of segments. Moreover, the segments may be positioned so as to allow mounting of the swing arms 33 at any required location along the rod 42. This is achieved simply by separating two adjacent segments from one another along the rod as necessary to create a space for the bearing 47 of the swing arm 33. In this way, the swing arms may be connected to the rod 42 at lateral locations dictated by the requirements of the particular tool bar 26 (e.g., by the lateral placement of the tines 27 on the tool bar) so that the mounting arms 31 may be located at available positions along the tool bar. The rod 42 may be supported by three sets of mounting arms 31 and swing arms 33 in the case of the leveler 40 which has been specifically illustrated, may be supported by two sets in the case of a shorter leveler or may be supported by four or more sets in the case of a longer leveler. Again, the toothed segments 41 impart flexibility to the construction and avoid the need of attaching the swing arms to the rod at rigidly pre-established locations along the rod.

Figure 7:
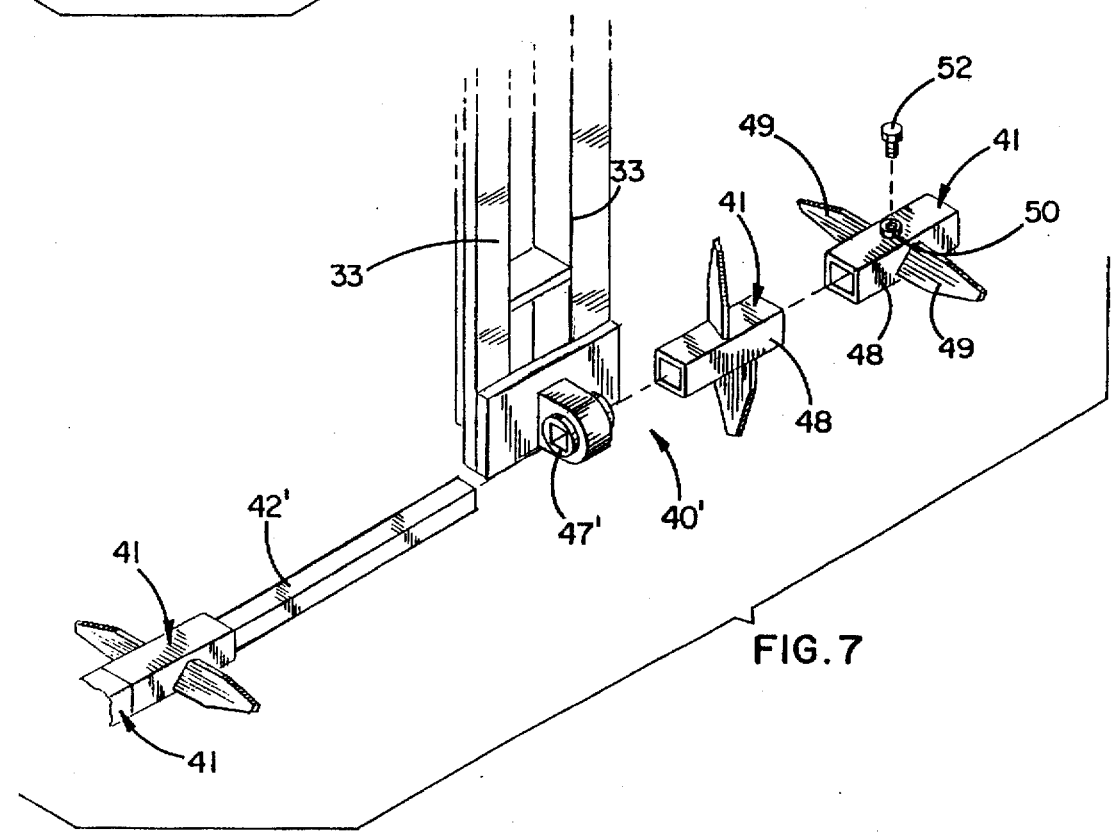
FIG. 7 is a view similar to FIG. 6 but shows a modified version of the harrow.
Figure 8:
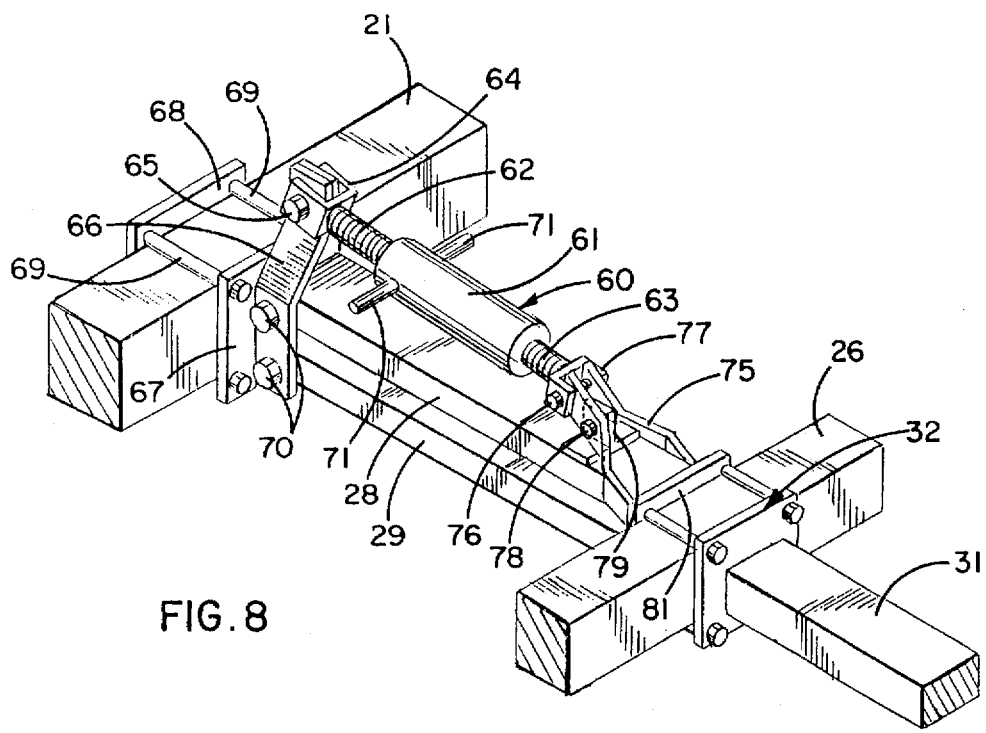
FIG. 8 is a perspective view primarily showing the parallel bar linkage and the height adjustment actuator for the implement.

A modified version of a leveler 40' is shown in FIG. 7 and differs primarily from the leveler 40 in that the rod 42' of the leveler 40' has the same square cross-section as the sleeves 48 and is rotatably supported by bearings 47' having square openings for receiving the rod. As a result of the square cross-sectional shape of the rod 42', the sleeves are automatically held against rotation on the rod and thus every sleeve need not be equipped with a tapped collar 50 and a set screw 52. In many cases, only the sleeves at the extreme ends of the rod need be provided with set screws for preventing the sleeves from sliding off of the rod. The square rod 42' is disadvantageous, however, in that adjacent teeth 49 cannot be spaced angularly from one another by a distance less than 90 degrees.

As shown most clearly in FIGS. 8–11, an actuator which herein is in the form of a hand-operated height adjusting jack 60 is associated with each set of parallel links 28 and 29 that connect the tool bar 26 to the beam 21 of the plow 20. By adjusting the jacks, the tool bar may be raised or lowered, with the parallel links serving to keep the tool bar substantially parallel to the ground and thereby keeping the tines 27 at a substantially constant attitude.

More specifically, each jack 60 comprises a barrel 61 within which are fixed a pair of nuts (not shown). Screws 62 and 63 of opposite hand are threaded into the nuts and extend from opposite ends of the barrel. The forward end of the screw 62 carries a clevis 64 which is pivotally connected at 65 to a generally A-shaped yoke 66 welded to a plate 67. The latter, in turn, is clamped to the beam 21 by a plate 68 and by U-bolts 69. The forward end portions of the upper and lower links 28 and 29 are pivotally connected to the yoke 66 at 70 to swing upwardly and downwardly about horizontal axes.

The screw 63 of each jack 60 is operably connected to the underlying upper link 28 in a manner to be described subsequently. When the barrel 61 is manually turned in one direction by means of radially projecting handles 71, the effective length of the jack is shortened so as to raise the link 28 and the tool bar 26. Conversely, rotation of the barrel in the opposite direction increases the effective length of the jack in order to lower the link 28 and the tool bar 26.

In accordance with another aspect of the invention, each jack 60 is connected to its underlying link 28 and the tool bar 26 in such a manner as to not only enable the tool bar to be kept substantially parallel to the ground when the jack is adjusted but also to allow the tool bar to float upwardly and downwardly if the tines 27 or the leveler 40 encounters a pronounced ridge or valley.

More specifically, the foregoing is achieved through the provision of a yoke 75 (FIGS. 8–11) having a forward end portion pivotally connected at 76 to a clevis 77 on the rear end of the screw 63 and having a rear end portion straddling the upper link and pivotally connected at 80 (FIG. 9) to a fixed plate 81, the latter forming part of the clamp 32 on the tool bar 26. The upper link 28 of each set also is pivotally connected to the plate 81 at 80 while the lower link 29 is pivotally connected to the plate at 82.

With the foregoing arrangement, adjustment of each jack 60 acts through the yoke 75 to force the upper link 28 upwardly or downwardly about its forward pivot 70. Movement of the upper link is transmitted by the tool bar 26 to the lower link 29 and thus the lower link remains parallel to the upper link while the tool bar remains substantially parallel to the ground. Accordingly, the height of the tines 27 may be adjusted without substantially changing the attitude thereof.

Figure 9:
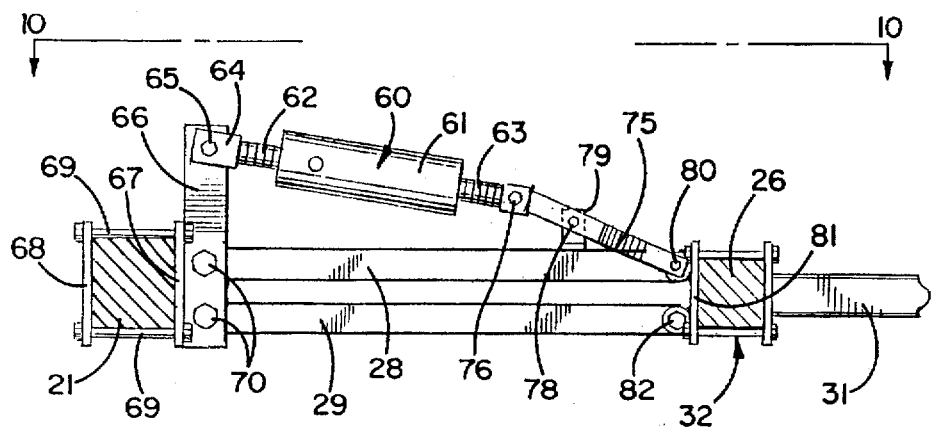
FIG. 9 is a side elevational view of the linkage and actuator shown in FIG. 8.
Figure 10:
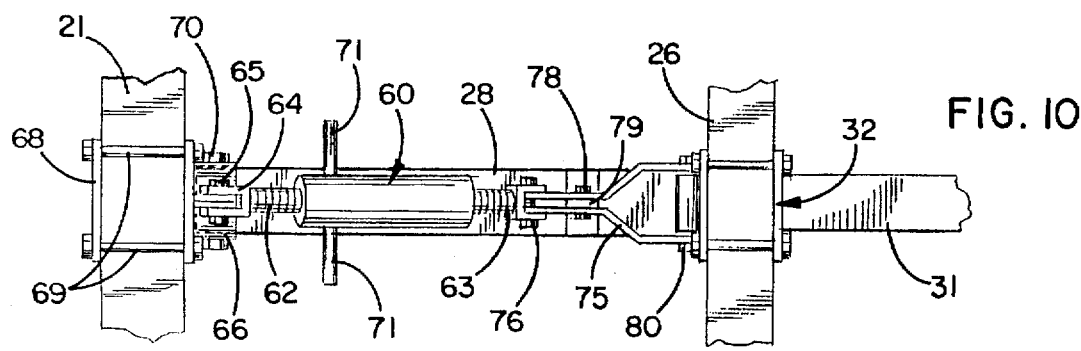
FIG. 10 is a top plan view of the linkage and actuator as seen substantially along the line 10—10 of FIG. 9.
Figure 11:
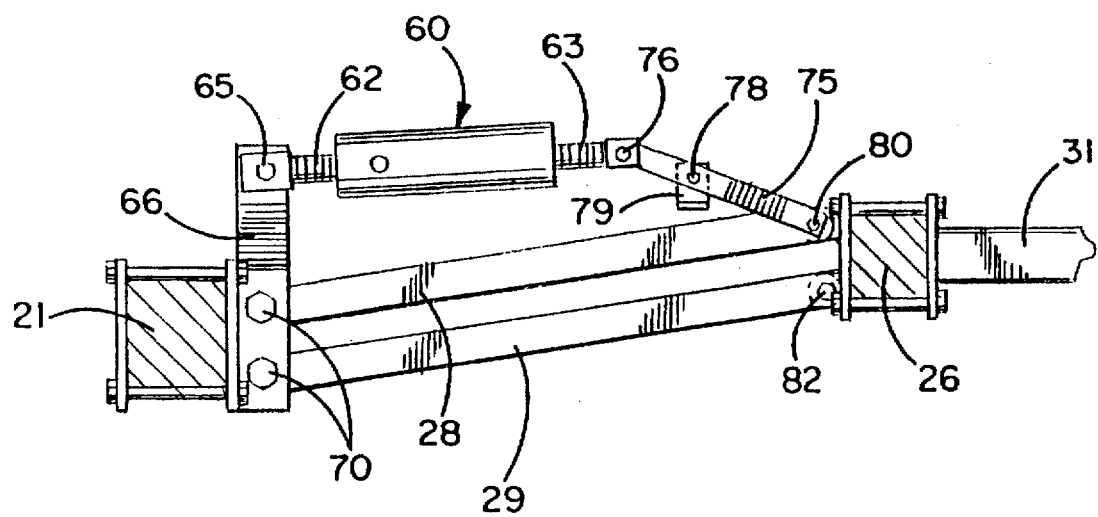
FIG. 11 is a view similar to FIG. 9 but shows certain components in moved positions.

An inverted T-shaped stop 79 includes a stem which is straddled by the yoke 75 and which is secured pivotally to the yoke by a bolt 78. When the tool bar 26 is in its normal position with the links 28 and 29 horizontal, a foot on the stop rests against the top side of the upper link as shown in FIG. 9. Engagement of the stop with the upper link keeps the yoke in an upwardly and forwardly inclined position so that an obtuse included angle is defined between the yoke and the screw 63 of the jack 60. If either the tines 27 or the leveler 40 encounters a ridge or other obstruction, the links 28 and 29 swing upwardly about their forward pivots 70 from the position shown in FIG. 9 toward that shown in FIG. 11. Because the stop 79 initially establishes an angular relation between the yoke 25 and the screw 63, the yoke is free to toggle relative to the screw to reduce the angle between the two and to allow the tool bar 26 to move upwardly to the position shown in FIG. 11 without the jack interfering with the upward movement and causing compressional binding or breakage of the various components. As the yoke toggles toward the screw, the stop 79 simply rises idly off of the upper link 28 (see FIG. 11). In a like manner, the links 28 and 29 may swing downwardly about the forward pivots 70 without interference from the jacks in the event the tines or the leveler rides through a valley.

I claim:

1. A harrow adapted to be towed forwardly by a tool bar and comprising an elongated and laterally extending rod, a plurality of sleeves telescoped onto said rod and sized so as to be capable of sliding along said rod, each of said sleeves having a plurality of angularly spaced teeth for working the ground, means for preventing said sleeves from rotating relative to said rod and for securing said sleeves against sliding along said rod, a first pair of adjacent sleeves being separated laterally from one another along said rod whereby a first space is defined between the sleeves of said first pair, a second pair of adjacent sleeves being spaced laterally along said rod from the sleeves of said first pair and being separated laterally from one another whereby a second space is defined between the sleeves of said second pair, first and second bearings disposed in said first and second spaces, respectively, and rotatably supporting said rod, and means connected to and extending upwardly from said bearings for supporting said bearings and for connecting said rod to said tool bar, said harrow being combined with said tool bar and with a beam adapted to be pulled forwardly, said tool bar trailing said beam, upper and lower parallel links each having a forward end portion pivotally attached to said beam and having a rear end portion pivotally attached to said tool bar, an actuator adapted when operated in one direction to effectively decrease in length and adapted when operated in the opposite direction to effectively increase in length, said actuator having forward and rear end portions with the forward end portion of said actuator being pivotally connected to said beam at a location spaced above the forward end portions of said links, a yoke straddling said upper link and having a forward end portion pivotally connected to the rear end portion of said actuator and a rear end portion pivotally attached to said tool bar to swing about an axis coinciding with the pivot axis of the rear end portion of said upper link, and a stop acting between said yoke and said upper link and causing said yoke normally to be inclined upwardly and forwardly at an obtuse included angle relative to the rear end portion of said actuator, said stop enabling said yoke to move to a position decreasing said angle when said upper link swings upwardly relative to said beam.

2. A harrow as defined in claim 1 in which each sleeve has a rectangular internal and external cross-sectional shape and includes at least two oppositely extending teeth.

3. A harrow as defined in claim 2 in which said rod is of circular cross-section, said preventing and securing means comprising screws extending threadably through said sleeves and having tips engaging said rod.

4. A harrow as defined in claim 2 in which said rod is of rectangular cross-section, said preventing and securing means being defined in part by the outer surface of said rod and by the inner surfaces of said sleeves and being further defined by screws extending threadably through at least some of said sleeves and having tips engaging said rod.

5. A harrow as defined in claim 1 in which a third pair of adjacent sleeves is located between and is spaced laterally from the sleeves of said first pair and the sleeves of said second pair, the sleeves of said third pair being separated laterally from one another whereby a third space is defined between the sleeves of said third pair, a third bearing disposed in said third space and coacting with said first and second bearings to rotatably support said rod, and means connected to and extending upwardly from said third bearing for supporting said third bearing and for additionally connecting said rod to said tool bar.

* * * * *